United States Patent [19]
Bale et al.

[11] Patent Number: 5,043,062
[45] Date of Patent: Aug. 27, 1991

[54] HIGH PERFORMANCE AFFINITY CHROMATOGRAPHY COLUMN COMPRISING NON-POROUS, NONDISPERSE POLYMERIC PACKING MATERIAL

[75] Inventors: Marsha D. Bale; Richard C. Sutton, both of Rochester, N.Y.

[73] Assignee: Eastman Kodak Company, Rochester, N.Y.

[21] Appl. No.: 601,106

[22] Filed: Oct. 18, 1990

Related U.S. Application Data

[63] Continuation of Ser. No. 312,515, Feb. 21, 1989, abandoned.

[51] Int. Cl.$^5$ .............................................. B01D 15/08
[52] U.S. Cl. .............................. 210/198.2; 210/502.1; 210/635; 210/656; 55/386
[58] Field of Search ...................... 210/635, 656, 198.2, 210/502.1; 502/402; 55/386

[56] References Cited

U.S. PATENT DOCUMENTS

| | | | |
|---|---|---|---|
| 3,664,967 | 5/1972 | Stehl | 210/635 |
| 4,111,838 | 9/1978 | Schaeffer | 210/656 |
| 4,161,407 | 7/1979 | Campbell | 525/379 |
| 4,177,038 | 12/1979 | Biebricher | 210/635 |
| 4,212,905 | 7/1980 | Tsibris | 210/656 |
| 4,290,776 | 9/1981 | Yamada | 210/638 |
| 4,416,784 | 11/1983 | Nakao et al. | 210/635 |
| 4,519,905 | 5/1985 | Stevens | 210/635 |
| 4,522,724 | 6/1985 | Ramsden | 210/635 |
| 4,523,997 | 6/1985 | Crane | 210/656 |
| 4,548,870 | 10/1985 | Ogawa | 204/299 R |
| 4,579,661 | 4/1986 | Gustafsson et al. | 210/635 |
| 4,663,163 | 5/1987 | Hou | 210/656 |
| 4,675,113 | 6/1987 | Graves | 210/635 |
| 4,747,956 | 5/1988 | Kiniwa | 210/692 |
| 4,775,520 | 10/1988 | Unger | 502/8 |
| 4,828,996 | 5/1989 | Siegel | 210/635 |
| 4,855,219 | 8/1989 | Bagchi | 430/496 |

OTHER PUBLICATIONS

Snyder, Introduction to Modern Liquid Chromatography John Wiley & Sons, Inc., New York, 1979, pp. 169-183 and 243.
U.S. Patent Application, 81,206 Filed Aug. 3, 1987, Sutton Entire Document.
U.S. Patent Application 98,583 Filed Sep. 18, 1987, Sutton et al. Entire Document.
U.S. Patent Application, 136,165 Filed Dec. 18, 1987, Sutton et al. Entire Document.
U.S. Patent Application 136,214 Filed Dec. 19, 1987, Sutton Entire Document.
U.S. Patent Application 315,086 Filed February 24, 1989, Sutton et al., Entire Document.

Primary Examiner—Ernest G. Therkorn
Attorney, Agent, or Firm—John R. Everett

[57] ABSTRACT

A high performance affinity chromatography separation device comprising:
A) a chromatographic column containing:
B) a packing material;
wherein the packing material is a plurality of non-porous, nondisperse polymeric particles having i) a particle size in the range of 0.01 to about 5 micrometers and ii) surface reactive groups which are directly or indirectly reactive with free amino groups, sulfhydryl groups, carboxy groups or aldehyde groups of biological ligands is disclosed.

6 Claims, No Drawings

HIGH PERFORMANCE AFFINITY CHROMATOGRAPHY COLUMN COMPRISING NON-POROUS, NONDISPERSE POLYMERIC PACKING MATERIAL

This is a continuation of application Ser. No. 312,515 filed Feb. 21, 1989, now abandoned.

FIELD OF THE INVENTION

This invention relates to high performance affinity chromatography (HPAC); a separation device to be used in HPAC and a method of HPAC using the device.

BACKGROUND OF THE INVENTION

High performance affinity chromatography has become a valuable tool for separating biological materials from aqueous media. Examples include biologically active molecules such as small ligands, proteins, nucleic acids, enzymes, etc.

The basic principle of affinity chromatography involves immobilization of one of the components of the interacting system (e.g., the ligand) to an insoluble support which can then be used to selectively adsorb, in a chromatographic procedure, that component (e.g. an enzyme) of a fluid medium (e.g. aqueous solution) with which it can selectively interact thereby forming a complex of the two components. Elution of the desired component can then be achieved by any one of a number of procedures which result in disassociation of the complex. Thus the specific biologic properties of macromolecules may be exploited for purification. The process may be used to isolate specific substances such as enzymes, hormones, specific proteins, inhibitors, antigens, antibodies, etc. on the basis of the biologic specific interactions with immobilized ligands.

High performance liquid affinity chromatography combines the remarkable specificity of affinity chromatography with the efficiency, sensitivity and speed of operation of high performance liquid chromatographic methods and apparatus.

Devices for carrying out high speed liquid chromatography and therefore high speed affinity chromatography have arranged in series along a path of flow, an eluant supply means comprising an eluant reservoir and a high pressure metering pump; a specimen material means comprising a specimen material injector; a separation device comprising a chromatographic column packed with packing material for the purpose of separating the biological material of interest; and a detector.

Procedures for carrying out high performance liquid affinity chromatography are described, for example, in *Methods In Enzymology*, vol. 104, pp. 212 et seq. In general, the procedure involves passing an aqueous sample comprising a biological material of interest through a chromatographic column. The solution is passed through the column under pressure. The column is packed with a support having an attached ligand. The ligand has an affinity for a biological species in the sample. As the sample passes through the column, the biological species binds to the ligand forming a ligand biological species complex. After the sample has passed through the column, an eluant designed to dislodge the biological material from the ligand is passed through the column under pressure. The eluant breaks up the ligand biological species complex thereby removing the biological species from the column.

Conversely, the procedure can be carried out in a manner that allows the biological species of interest to pass through the column without binding while other materials from which the biological species is to be separated bind to the ligand.

The packing materials in prior art separation devices used in high performance affinity chromatography are porous materials such as silica or porous polymeric particles. Such porous materials present several problems.

First, pores may be clogged by the biological species in the mixture to be separated. This decreases the efficiency of utilization of immobilized ligands and can lead to the requirement of higher pressure for maintenance of a constant flow rate. The mechanical strength of porous packings is generally low enough to cause collapse of the bed at fairly low pressures (<1,000 psi for macroporous polymers and up to 4,000 psi for silica particles). This limitation also prevents use of concentrated samples. Thus it is generally necessary to dilute samples to accommodate porous particles.

It would be expected that porous particles would provide greater surface area over non-porous particles This, in practice, is not the case. Depending on the size of the pores, porous particles are relatively inefficient for use with large molecules of biological interest. For example, a useful ligand may be attached to a porous bead in one of the pores. The biological species which it is desired to eliminate or separate from the liquid stream may be so large as not to be able to get down into the pores and reach the ligand Conversely, immobilization of a large affinity ligand can only take advantage of a small portion of the total surface area since the ligand itself cannot penetrate the porous well. Thus, the efficiency of binding is diminished and the apparent surface area advantage of such porous particles becomes illusory.

Also the prior art porous particles are about 5–10 μm in size to avoid build up of back pressure and collapse of the bed.

SUMMARY OF THE INVENTION

The present invention provides a high performance affinity chromatography separation device comprising:
A) a chromatographic column containing:
B) a packing material;
wherein the packing material is a plurality of non-porous, monodisperse polymeric particles having i) a particle size in the range of 0.01 to about 5 micrometers (μm) and ii) surface reactive groups which are directly or indirectly reactive with free amino groups, sulfhydryl groups, carboxy groups or aldehyde groups of biological ligands.

The particles used as packing material are able to withstand greater pressures than porous beads. The particles do not collapse under pressures at which porous Particles of the prior art collapse.

They have more effective surface azea than the larger porous beads used cf the prior art.

The particles are preferably 1 to 3 μm. Surprisingly they do not clog the column. Reasonable back pressure can be used to pump eluant through columns containing these particles. It is important that the particles be monodisperse as opposed to polydisperse. Monodisperse means the distribution of particle sizes of 3 σ (sigma) is equal to or less than 7% of the mean particle diameter. Polydisperse refers to particles having widely varying sizes. Polydisperse would not work in these circumstances. The smaller particles of a mixture of polydisperse particles would fill up the interstices between the larger particles thereby causing increased back pressure.

The present invention also provides a method of separating a biological species from an aqueous solution comprising the steps of:
A) providing an aqueous sample suspected of comprising the biological species of interest;
B) providing a high performance affinity chromatography separation device according to the present invention; and
C) carrying out high performance liquid chromatography on the sample thereby achieving the desired separation.

DETAILS OF THE INVENTION

The separation device of this invention includes a unique chromatographic column containing a bed of the above described particles as packing materials. The columns are generally made of stainless steel. For example, stainless steel No. 316 is often used. It is an alloy according to a U.S. standard defined by the American Institute for Standards in Industry (AISI). It is an alloy which shows an excellent resistance against corrosion. The roughness of the tube of the inner wall is a specification governed by the chromatography. As a rule of thumb, the wall roughness expressed as peak to peak value should be less than one tenth of the means size of the particles packed in the column. This means that the wall roughness should be smaller than 0.5 $\mu m$, when 5 $\mu m$ particles are packed in the column. Glass, polymer or gold lined tubing is also used in chromatographic columns.

Glass tubes were recently introduced. The excellent wall properties of glass were an incentive for this. Pressure limitations make these useful in low and medium pressure applications.

Tube diameters used for analytical columns range from 4 to 8 mm internal diameter for medium bore columns; 2 to 4 mm internal diameter for small bore columns; and 1 to 2 mm internal diameter for micro bore columns.

The terms given to the diameter are indications currently used for the columns and for their chromatographic application. The internal diameter of the column is a very important factor which has to be selected properly to match the application. Columns within the above ranges of internal diameter are commercially available.

The columns are operated under high pressure. There are certain wall thicknesses required for safety reasons. The 0.25 inch tubing most often used has, with an internal diameter of 4.6 mm, a wall thickness of 0.9 mm which is sufficient. Thicker wall tubing, with the same internal diameter is offered by some manufacturers. The length of the columns may be from 50 to 100 mm in length. Although larger or shorter lengths are also useful For small diameter packings ($<\sim$10-20 $\mu m$) the column is packed with the chromatographic resin from a slurry. One end of the column is fitted with a frit and end piece. The other end is attached to a slurry packing device. High pressures (often around 10,000 psi or 68,948 kPa) are applied to force the slurry into the column and pack it rapidly (within minutes). Lower pressures (up to 6,000 psi or 41,369 kPa) can also be used to pack the column more slowly (within 30-60 minutes).

The column is then disconnected from the packing apparatus and fitted with an end piece.

Conventional HPLC equipment may be used for separations, generally at room temperature. The flow rate is usually maintained at about 0.1 3 mL per minute for a standard 5 mm ID column. A typical value is 1 mL per minute, which gives a pressure over a 5 cm column loaded with 2 $\mu m$ particles of about 1,000-3,000 psi (6,900-21,000 kPa).

Column Packing Material

The packing material is made up of Polymeric particles. The particles are water insoluble latex particles having a particle size in the range of from about 0.01 to about 5 $\mu m$, and preferably from about 0.1 to about 3 $\mu m$. The particles are non-porous and monodisperse.

The particles also have surface reactive groups which are directly or indirectly reactive with nucleophilic free amino groups and sulfhydryl groups of biological ligands. Such reactive groups are electrophilic and include:
  a) active halogen groups;
  b) activated 2-substituted ethylsulfonyl or activated vinylsulfonyl groups;
  c) reactive carboxyl groups;
  d) epoxy groups;
  e) isocyanate groups;
  f) aziridine groups;
  g) aldehyde groups;
  h) 2-substituted ethylcarbonyl groups; and
  i) succinimidoxycarbonyl groups.

Surface reactive groups a), b), c) and i) are preferred.

In cases where the biological species is a protein that contains, or has been modified to contain, electrophilic groups (carboxy, aldehyde, etc.) the polymer particles can have surface reactive nucleophilic groups such as amines, sulfhydryl, etc.

In general, the polymers employed to form the particles of this invention conform to the general structure:

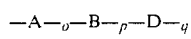

$$-A-_o-B-_p-D-_q \qquad I$$

wherein —A— represents recurring units derived from one or more hydrophobic ethylenically unsaturated monomers,
  —B— represents recurring units derived from one or more ethylenically unsaturated monomers having the requisite reactive groups which will directly or indirectly react with the free amine or sulfhydryl groups of a ligand with biological specificity as described herein, and
  —D— represents recurring units derived from one or more ethylenically unsaturated monomers which are different than those represented by —A— or —B—.

In formula I, o is from 0 to 99.9 mole percent, p is from about 0.1 to 100 mole percent, and q is from 0 to about 20 mole percent. Preferably, o is from about 45 to about 99 mole percent, p is from 1 to about 50 mole percent, and q is from 0 to about 10 mole percent.

The —A— recurring units are derived from one or more hydrophobic ethylenically unsaturated monomers. Such monomers are insoluble in water. Representative hydrophobic monomers include, but are not limited to, styrene and styrene derivatives (for example, vinyltoluene, 2,5-dimethylstyrene, 4-t-butylstyrene and 2-chlorostyrene), acrylic and methacrylic acid esters (for example, n-butyl acrylate, propyl methacrylate, methyl acrylate, ethyl methacrylate, 2-ethylhexyl methacrylate, N-phenyl-acrylamide and methyl methacrylate), acrylonitrile and vinyl acetate.

The polymer can be crosslinked, if desired, in any suitable fashion. One method is to incorporate a small amount, that is up to about 15 mole percent, and preferably from about 0.3 to about 5 mole percent, of a monomer having two or more ethylenically unsaturated polymerizable groups These monomers are included among the hydrophobic monomers from which A is derived. Representative monomers are described in *Research Disclosure*, publication 19551. July, 1980, page 304, and include for example, divinylbenzene, ethylene dimethacrylate, N,N'-methylenebisacrylamide, 2,2-dimethyl-1,3-propylene diacrylate, allyl acrylate, ethylidyne trimethacrylate and ethylene diacrylate.

Particularly useful monomers from which —A— is derived are styrene, vinyltoluene, ethylene dimethacrylate, butyl acrylate, divinylbenzene, 2-ethylhexyl methacrylate and methyl methacrylate.

The —B— recurring units compromise an appended reactive group that readily reacts with an amine or sulfhydryl group with or without the use of an intermediate crosslinking agent. The B groups can therefore be derived from any monomer containing such reactive groups. Preferred monomers are those comprising appended reactive groups a) to i) mentioned hereinbefore.

One preferred class of monomers which provide the requisite reactive groups are those comprising an active halogen atom which readily reacts with amine and sulfhydryl groups.

Examples of monomers having an active halogen atom include vinyl chloroacetate, vinyl bromoacetate, haloalkylated vinyl aromatics (for example, chloromethylstyrene or bromomethylstyrene), haloalkyl acrylic or methacrylic esters (for example, chloroethyl methacrylate, 3-chloro 2-hydroxypropyl methacrylate and 3 chloropropyl acrylate) and others known to one skilled in the art. The haloalkylated vinyl aromatics, for example those having active haloalkyl groups of 1 to 3 carbon atoms, are preferred when the active halogen atom is used as the reactive group. Chloromethylstyrene is very useful.

Although monomers having active halogen atoms exhibit many advantages, monomers having activated 2-substituted ethylsulfonyl and vinyl sulfonyl groups possess additional advantages in that proteins can be attached to the polymers under milder conditions and require less process control during manufacture. This renders manufacture more efficient and less costly. A number of representative monomers having the latter groups are known in the art, including those disclosed in U.S. Pat. Nos. 4,161,407 (issued July 17, 1979 to Campbell) and 4,548,870 (issued Oct. 22, 1985 to Ogawa et al).

Preferred activated 2-substituted ethyl sulfonyl and vinylsulfonyl monomers can be represented by the formula (II):

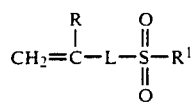

wherein R is hydrogen or substituted or unsubstituted alkyl (generally of 1 to 6 carbon atoms, such as methyl, ethyl, isopropyl or hexyl. Preferably, R is hydrogen or methyl.

$R^1$ is —CH=CHR$^2$ or —CH$_2$CH$_2$X wherein X is a leaving group which is displaced by a nucleophile or is eliminated in the form of HX by treatment with a base (such as halo, acetoxy, alkylsulfonyloxy such as methylsulfonyloxy, aryl sulfonyloxy such as p-tolylsulfonyloxy, trialkyl ammonio, for example, a trimethylammonio salt or pyridinio salt). $R^2$ is hydrogen, substituted or unsubstituted alkyl (generally of 1 to 6 carbon atoms as defined for R), or substituted or unsubstituted aryl (generally of 6 to 12 nuclear carbon atoms, such as phenyl, naphthyl, xylyl or tolyl). Preferably, $R^1$ is —CH$_2$CH$_2$X. This group, which is an activated 2-substituted ethyl group, can be substituted with any group which does not impair the displacement of the leaving group X.

L is a linking group which can be a substituted or unsubstituted alkylene generally having 1 to 20 carbon and hetero atoms in the backbone. This definition of alkylene is meant to include alkylene groups interrupted or terminated with oxy, thio, —NR$^3$—[wherein R$^3$ is hydrogen, substituted or unsubstituted alkyl of 1 to 6 carbon atoms (such as methyl, chloromethyl or 2-hydroxyethyl) or substituted or unsubstituted aryl of 6 to 10 carbon atoms (such as phenyl, naphthyl or xylyl)], ester (—COO—), amide (—CONH—), urylene

sulfonyl (—SO$_2$—), carbonate, sulfonamide, azo, phosphono or other similar groups. Representative alkylene groups include methylene, ethylene, isobutylene, hexamethylene, carbonyloxyethoxy carbonyl, methylenebis(iminocarbonyl), carbonyloxy dodecylenecarbonyloxyethylene, carbonyliminom ethyleneiminocarbonyliminoethylene, carbonyliminom ethyleneiminocarbonylethylene and other groups described or suggested by U.S. Pat. Nos. 4,161,407 and 4,548,870, noted above.

L can also be substituted or unsubstituted arylene generally having 6 to 12 nuclear carbon atoms. Representative arylene groups include phenylene, tolylene, naphthylene and others noted in the patents mentioned above. Also included in this definition of L are divalent groups which are combinations of one or more of each of the alkylene and arylene groups defined above (for example, arylenealkylene, alkylenearylenealkylene and others readily determined by one of ordinary skill in the art). Preferably, L is substituted or unsubstituted phenylenealkylene, phenylenealkylene substituted with one or more alkyl groups (as defined for R), alkoxy groups (generally of 1 to 6 carbon atoms, for example, methoxy, propoxy or butoxy) or halo groups, or carbonyliminomethyleneiminocarbonylethylene.

Representative 2-substituted ethylsulfonyl and vinyl sulfonyl monomers from which B can be derived include m & p-(2-chloroethylsulfonylmethyl)styrene, m & p-(p-tolylsulfonyloxy)ethylsulfonylmethyl]styrene, m & p-vinylsulfonylmethylstyrene, N-[m & p-(2-chloroethylsulfonylmethyl)phenyl]acrylamide, and N-[2-(2-chloroethylsulfonyl)ethylformamidomethyl]acrylamide. The first monomer is preferred.

Another preferred reactive group that can be appended to form recurring units B is the carboxyl group.

Carboxyl groups can be added to the particles by incorporating monomers containing such groups as, for example, acrylic acid, methacrylic acid, itaconic acid, 2-carboxyethyl acrylate, fumaric acid, maleic acid, 2-carboxyethyl methacrylate carboxymethylstryene, methacrylamidohexanoic acid, N-(2-carboxy-1,1-dimethylethyl)acylamide, and the like), or by further chemical reaction of a polymer having other reactive groups which can be converted to carboxyl groups (for example, by hydrolysis of anhydrides, such as maleic anhydride, or by oxidation of surface methylol or aldehyde end groups).

An auxiliary crosslinking agent is used to covalently attach proteins, e.g., antigens, antibodies, haptens, etc. via the carboxyl groups since the carboxy groups alone react too slowly with amine and sulfhydryl groups for most practical purposes. One useful class of auxiliary crosslinking agents are the well known carbodiimides, e g., 1-cyclohexyl-3-[2-morpholinyl-(4)-ethyl]carbodiimide metho-p-toluenesulfonate, which have been used for crosslinking gelatin in photographic gelatin layers and for making diagnostic reagents as described in U.S. Pat. No. 4,181,636.

Another preferred class of auxiliary crosslinking agents includes the carbamoylonium salts such as are described in U.S. Patent 4,421,847 (issued Dec. 20, 1983 to Jung et al). Representative carbamoylonium compounds include 1-(4-morpholinocarbonyl)-4-(2-sulfoethyl)pyridinium hydroxide, inner salt, and 1-(4-morpholinocarbonyl)pyridinium chloride.

Other monomers which can be incorporated in the polymers to provide the requisite reactive groups include monomers containing epoxy groups (such as glycidyl acrylate, glycidyl methacrylate, vinyl glycidyl ether or methallyl glycidyl ether), monomers containing isocyanate groups (such as isocyanatoethyl acrylate, isocyanatoethyl methacrylate, or $\alpha, \alpha$-dimethylmetaisopropenylbenzyl isocyanate), monomers containing an aziridine group [such as vinylcarbamoyl aziridine, N-methacryloylaziridine, N-acryloylaziridine and 2-(1-aziridinyl)ethyl acrylate], monomers containing aldehyde groups (such as vinyl benzaldehyde or acrolein) or 2-substituted ethylcarbonyl containing monomers (such as 2-chloroethyl acrylate, 2-chloroethyl methacrylate, 2-methylsulfonyloxyethyl methacrylate and 2-p-tolysulfonyloxyethyl acrylate).

D represents recurring units derived from one or more ethylenically unsaturated monomers other than those represented by A or B. Such monomers can have ionic or other hydrophilic groups which add dispersion stability to the resulting particles in aqueous solution or influence the biological activity of an immobilized ligand. Useful ionic monomers include, but are not limited to, sodium 2-acryl amido-2-methylpropanesulfonate, sodium 3-acryloyloxy propanesulfonate, sodium acrylate, sodium methacry late, and sodium styrenesulfonate, as well as other known sulfonates, sulfates, carboxylates, their salts or anhydrides, and useful nonionic polar monomers include 2-hydroxyethyl acrylate. 2,3-dihydroxypropyl acrylate, acrylamide, 2-hydroxyethyl methacrylate, N-isoPropylacrylamide, 2-hydroxypropyl methacrylate, acrylonitrile and N-isobutoxymethyl acrylamide. Preferred monomers are sodium 2-acrylamido 2-methyl propanesulfonate, sodium acrylate, sodium 3-acryl oyloxypropanesulfonate, sodium methacrylate, 2-hydroxyethyl acrylate, 2,3-dihydroxypropyl acrylate, acrylamide, N-isopropylacrylamide and acrylonitrile.

The polymer particles of this invention can be homogeneous particles being composed of the same polymer throughout, or they can be particles composed of more than one polymer such as graft copolymers as described, for example, in U.S. Pat. No. 3,700,609 (issued Oct. 24, 1972 to Tregear et al) and core shell polymers described for example in U.S. Pat. No. 4,401,765 (issued Aug. 30, 1983 to Craig et al). This is advantageous when any of the recurring units of the polymer that must be on the particle surface such as those containing the reactive groups or groups that impart dispersion stability are expensive. A polymer particle can be prepared from cheap monomers, or monomers that regulate buoyancy, then polymerization is continued to add a shell of a different polymer having the requisite surface groups.

The polymeric particles can be prepared using any suitable polymerization technique, including emulsion (including batch, semi continuous and continuous) and suspension polymerization techniques, graft copolymerization, and others known to one skilled in the polymer chemistry art. Emulsion polymerization is preferred as it can be used to provide generally smaller particles without the use of surfactants or emulsifiers as described for example in U.S. Pat. No. 4,415,700 (noted above) and *Research Disclosure* publication 15963 (July, 1977). *Research Disclosure* is a publication available from Kenneth Mason Publications, Ltd., The Old Harbourmaster's, 8 North Street, Emsworth, Hampshire P010 7DD, England.

Continuous emulsion polymerization is the most preferred technique, as described in the noted *Research Disclosure* publication. Other details of preparatory methods can be found in U.S. Pat. Nos. 4,161,407 and 4,548,870.

Staged emulsion polymerization can be used to provide a core shell polymer composed of two different polymers. Emulsion polymerization of the core is carried to substantial completion by continuously adding reactants to a reaction vessel under standard conditions. Monomers and catalysts needed to make the shell polymer are then continuously added to the vessel containing the latex of the core polymer. In this manner, the shell has a definite known composition rather than being a mixture of core and shell monomers.

Representative polymers useful in this invention include the following: poly(m & p-chloro-methylstyrene), poly(styrene-co-m & p chloromethylstyrene-co-2-hydroxyethyl acrylate) (67:30:3 molar ratio), poly(styrene-co-m & p chloroethylsulfonylmethylstyrene) (95.5:4.5 molar ratio), poly[styrene-co-N-[m & p-(2-chloroethylsulfonylmethyl)phenyl]acrylamide](99.3:0.7 molar ratio), poly(m & p-chloromethylstyrene-co-methacrylic acid)(95:5, 98:2 and 99.8:0.2 molar ratio), poly(styrene-co-m & p-chloroethylsulfonylmethylstyrene-co-methacrylic acid)(93.5:4.5:2 molar ratio), poly{styrene-co-N-[m & p-(2-chloroethylsulfonylmethyl)phenyl]acrylamide-co-methacrylic acid}(97.3:0.7:2 molar ratio), poly(styrene-co-m & p-chloromethylstyrene)(70:30 molar ratio), poly(styrene-co-vinylbenzyl chloride-co-acrylic acid) (85:10:5 molar ratio), poly(styrene-co-acrylic acid) (99:1 molar ratio), poly(styrene-co-methacrylic acid) (90:10 molar ratio), poly(styrene-co-acrylic acid-co-m & p-divinylbenzene) (89:10:1 molar ratio), poly(styrene-co-2-carboxyethyl acrylate) (90:10 molar ratio), poly(methyl methacrylate-co-acrylic acid) (70:30 molar ratio), poly(styrene-co-m & p-vinylbenzaldehyde)(95:5 molar ratio), and poly(styrene-co-m & p-vinylbenzaldehyde-co-methacrylic acid)(93:5:2 molar ratio).

Any reactive amine or sulfhydryl containing ligand can be attached to polymeric particles according to the present invention as long as that ligand contains a reactive amine or sulfhydryl group, respectively which will react with the reactive groups on the polymer or with the intermediate formed by the reaction of a carbodiimide or a carbamoylonium compound with carboxyl groups on the particles in the case which the polymer has reactive carboxyl groups.

Polymers having reactive groups that readily react directly with the amine or sulfhydryl groups on the ligands are simply mixed with the ligands, in an appropriate buffer if necessary, and allowed to react.

The attachment of the ligand to carboxyl group containing polymer particles, however, is carried out in two steps, the first of which involves contacting an aqueous suspension of the polymeric particles with a carbodiimide or a carbamoylonium compound to produce reactive intermediate polymer particles having intermediate reactive groups in place of the carboxyl groups. This step is carried out at a suitable pH using suitable acids or buffers to provide the desired pH. Generally, the pH is less than 6, but this is not critical as long as the reaction can proceed. More likely, the pH is between about 3.5 and about 6. The molar ratio of carbodiimide or carbamoylonium compound to the carboxyl groups on the surface of the particles is from about 1:100 to about 10:1, and preferably from about 1:10 to about 2:1.

In the second step of the method, the reactive intermediate formed in the first step is contacted with a reactive amine or sulfhydryl group containing ligand. A covalent linkage is thereby formed between the particles and the reactive compound. The weight ratio of the reactive compound to the polymeric particles is generally from about 1:1000 to about 1:1, and preferably from about 1:100 to about 1:10.

Ligands

Biological ligands of interest having the requisite free amino or sulfhydryl group include:
a) Protein A which has an affinity for the Fc portion of IgG antibodies.
b) Avidin or avidin complexes which have an affinity for biotin or biotin complexes.

Avidin and biotin derivatives which can be used to prepare the reagents of this invention include streptavidin, succinylated avidin, monomeric avidin, biocytin (that is, biotin-$\epsilon$-N-lysine), biocytin hydrazide, amine or sulfhydryl derivatives of 2-iminobiotin and biotinyl-$\epsilon$-aminocaproic acid hydrazide, biotin derivatives, such as biotin-N-hydroxy succinimide ester, biotinyl-$\epsilon$-aminocaproic acid-N-hydroxysuccinimide ester, sulfosuccinimidyl 6-(biotin amido)-hexanoate, N-hydroxysuccinimide iminobiotin, biotin-bromoacetylhydrazide, p-diazo-benzoyl biocytin and 3-(N-maleimidopropionyl)biocytin.

c) Monoclonal antibodies which have specialized affinity for the antigen against which it was raised and their antigens.
d) Polyclonal antibodies and their respective antigens.
e) Lysine which has an affinity for plasminogen
f) Proteins and other biological macromolecules which have specialized affinity for another protein or biological macromolecule of interest such as gelatin which has affinity for fibronectin.
g) Small molecule and oligomeric species having specialized affinity for oligomeric or macromolecular biological molecules, e.g. sugars, DNA bases, DNA oligomers and hormones.
h) Macromolecules that have specificity for particular classes of biological molecules such as Concavalin A which has specificity for certain sugars and sugar containing macromolecules; heparin which has affinity for coagulation factors, lipoproteins, plasma proteins, etc.
i) Small molecules that have specialized affinity for classes of biological molecules such as the dye Cibarcon ® Blue F3G-A and other protein specific hydrophobic dyes that have specificity for albumen, enzymes requiring adenlyl-containing cofactors, coagulation factors and interferron.

A general procedure for preparing the packing material from the polymer particles includes covalently attaching the selected ligand to the particles using generally known reactions. With many pendant groups, for example the haloalkyl, 2-substituted activated ethylsulfonyl and vinyl-sulfonyl, the ligand can be directly attached to the particles. Generally, the polymer particles are mixed with the ligand in an aqueous buffered solution (pH generally from about 5 to about 10) and a concentration of from about 0.1 to about 40 weight percent polymer particles (preferably from about 0.1 to about 10 weight percent). The amount of ligand is at a ratio to polymer of from about 0.1:1000 to about 1:10, and preferably from about 1:100 to about 1:10. Mixing is carried out at a temperature in the range of from about 5° to about 50° C., and preferably at from about 5° to about 40° C., for from about 0.5 to about 48 hours. Any suitable buffer can be used.

In some instances, the pendant reactive groups on the outer surface must be modified or activated in order to cause covalent attachment of the ligand. For example, carboxyl groups must be activated using known carbodiimide or carbamoylonium chemistry, described supra.

In other instances, an epoxy group on the outer surface can be hydrolyzed to form a diol compound capable of reacting with cyanogen bromide which can act as a coupling agent for amine groups in the immunological species. Aldehydes can react directly with amines to form a Schiff's base which can be subsequently reduced to form a covalent link. Alternatively, the aldehyde can be oxidized to an acid and chemistry identified above for carboxyl groups can be used to form an amide linkage.

The following examples establish the utility of the present invention.

EXAMPLE 1

A. Preparation of High Performance Affinity Chromatography (HPAC) Polymer Particles with Attached Ligand A quantity (13.02 g) of 2 $\mu$m poly(styrene-co-2-chloroethylsulfonylmethylstyrene (molar ratio 95.5/4.5) beads were combined with 86.48 ml of 0.1 M 4-(2-hydroxyethyl)-1-piperazinepropanesulfonic acid (EPPS) buffer (pH 8.5) and 0.50 mL Protein A at 20 mg/ml. Protein A was covalently bound to the polymer beads through the pendant chloroethylsulfonyl group. After 5 hours at room temperature, 10 ml of 10% BSA (bovine serum albumin) was added and the reaction continued for 16 hours at room temperature. BSA is used to cap any pendant chloroethylsulfonyl groups which have not reacted with protein A. This prevents binding of any undesirable components. The beads were centrifuged and the supernatant discarded. The beads were resuspended an washed with PBS (phosphate buffered saline) three times and finally resuspended in 30 ml of PBS containing 0.01% merthiolate and stored at 4° C.

B. Preparation of High Performance Affinity Chromatography (HPAC) Packed Column

The above prepared polymer particles with attached Protein A ligand (22 ml at 4.4% solids) was charged into a Micrometrics Preparative Slurry Packer fitted with a precolumn and packed into a 4.6×40 mm chromatographic column by pumping PBS into the packer at 1.6 mL/minute. After the pressure reached 6000 Psi (43 kPa), the flow rate was reduced to 1.5 mL/minute for 6 minutes and then reduced to 1.4 mL/minute for 25 minutes. After disconnecting the column from the packer and adding an end fitting, the column was pretreated with the binding and elution solvents (mobile phases) which were used in the intended separation. Thus the column was equilibrated with a solution containing a) 1.5 M glycine and 2.0 M NaCl (pH 8.9); then with a solution containing b) 0.1 M sodium citrate (pH 3); and then with a solution containing c) 1.5 M glycine and 2.0 M NaCl (pH 8.9). The column was then treated with 1 mL of 1% BSA; and finally with 0.1 M sodium citrate (pH 3) until the baseline of absorbance at 280 nm returned. All flow rates were 0.5 mL/minute. The column was stored at 4° C in PBS containing 0.1 mM sodium azide.

The flow rate/pressure characteristics with PBS as the solvent are shown in Table I. The data are presented in the order in which they were obtained. The results show there is no hysteresis (meaning that the beads did not collapse) for flow rates up to at least 1.4 mL/minute PBS.

TABLE I

| Pressure/Flow Characteristics Using PBS Solvent | |
|---|---|
| Flow Rate. mL/min | Pressure. psi |
| 0.5 | 1380 (9.5 kPa) |
| 0.6 | 1620 (11.2 kPa) |
| 0.8 | 2160 (14.9 kPa) |
| 1.0 | 2640 (18.2 kPa) |
| 1.2 | 3120 (21.5 kPa) |
| 1.4 | 3600 (24.8 kPa) |
| 1.2 | 3120 (21.5 kPa) |
| 1.0 | 2640 (18.2 kPa) |
| 0.8 | 2160 (14.9 kPa) |
| 0.6 | 1620 (11.2 kPa) |

C. Separation of a Rat Monoclonal Antibody CK 14.52 from Cultured Media

A concentrated PBS solution of an ammonium sulfate precipitate of conditioned media from a rat cell line secreting CK 14.52 was prepared. A 0.5 mL sample thereof was applied at 1.0 mL/minute to the high performance affinity chromatography Protein A column prepared as described in B, supra. The column had been equilibrated with a buffer solution of 1.5 M glycine in 2 M NaCl (pH 8.9). The same buffer was used to elute the non product peak. The non product peak includes the quantity of CK 14.52 that passed through the column without binding when the aqueous ample was applied to the column. Elution of the CK 14.52 antibody was with 0.1 M sodium citrate pH 5. Samples (1.0 mL each) were collected throughout the separation process. Samples with absorbances at 280 nm greater than 0.06 were analyzed for CK 14.52 using an ELISA specific assay for rat monoclonal antibodies. The results are shown in Table II. The results indicate quantitative recovery of the CK 14.52 and a capacity of 945** $\mu$g at a flow rate of 1.0 mL/minute.

TABLE II

| Quantification of CK 14.52 in Column Fractions | |
|---|---|
| Sample | CK 14.52. $\mu$g |
| fraction 3 | 420 ± 28 |
| fraction 4 | 32 ± 0.9 |
| fraction 9 | 37 ± 3 |
| fraction 10 | 700 ± 100 |
| fraction 11 | 208 ± 28 |
| applied sample | 1375 ± 20 |
| pass through | 452 ± 28* |
| product peak | 945 ± 104** |
| total eluted | 1397 ± 107 |

*Total of fractions 3 and 4
** Total of fractions 9, 10 and 11

EXAMPLE 2

Separation of a Mouse $IgG_{2A}$ from Ascites Fluid

A sample of reconstituted ascites fluid (Sigma)(0.05 ml) was applied to the column prepared in Example 1B a 1 mL/minute following equilibration of the column with the 1.5 M glycine and 2 M NaCl buffer (pH 8.9). The non binding material was eluted with the same buffer. Elution of the mouse $IgG_{2A}$ was with 0.1 M sodium citrate, pH 3.0. Fractions of 1 mL each were collected into tubes containing 0.5 mL 0.2 M Tris pH 8.0. Column fractions were quantified using an ELISA for mouse $IgG_{2A}$, and the results are shown in Table III. It is clear that all of the $IgG_{2A}$ applied to the column is being recovered with <1% of it coming through with the non binding fraction.

TABLE III

| Quantification of Mouse IgG2A in Column Fractions | |
|---|---|
| Sample | Mouse $IgG_{2A}$. $\mu$g |
| fractions 1-3 | 1.0 |
| fractions 11 – 14 | 8.4 |
| fraction 12 | 281 |
| fraction 13 | 82 |
| applied sample | 369 |
| pass through | 1.0* |
| product peak | 371.4** |
| total eluted | 372 |

*Total of fractions 1-3
**Total of fractions 11-14

EXAMPLE 3

Separation of Plasminogen from Bovine Plasma on a HPAC Column Packed with Non-Porous Beads Modified In Situ to Contain Lysine Ligand A. This column was prepared in situ. A quantity (14 ml at 8.0% solids) of 2 $\mu$m poly(styrene-co-2-chloroethylsulfonylmethylstyrene) non-porous beads (molar ratio 95.5/4.5) was charged into a Micrometrics preparative slurry packer fitted with a precolumn and packed into a 4.6×50 mm column by pumping water into the packer at 0.8 mL/minute. At the conclusion of packing, the column was disconnected from the packer, and an end fitting was added. Determination of the solids of the unpacked latex showed that a total of 0.54 g of the non-porous beads were packed into the column.

Lysine ligand was coupled covalently to the non-porous beads by pumping lysine at 1 mM in 0.1 M EPPS, pH 8.5 through the column at 0.3 mL/minute for 15 hours. Aliquots of bovine serum albumin (1 mg in 1 mL) were injected into the column at 0.5 mL/minute until the entire protein sample added was eluted (elution buffer 0.1 M EPPS, pH 8.5). A total of 6 aliquots was injected; 0.4 mg of bovine serum albumin was retained by the column. The column was allowed to incubate at room temperature overnight to allow coupling of bound bovine serum albumin to the resin.

B. Separation of Plasminogen

A 1 mL sample of bovine plasma (predialyzed against PBS with 0.1 mM EDTA) was injected onto the column. The column had been equilibrated in 0.4 M sodium phosphate, pH 7.2, at 0.5 mL/minute. The same buffer was used to elute the non retained proteins. Elution of product was with 0.2 M epsilon amino caproic acid in PBS. The small peak eluted by this buffer was analyzed by gel electrophoresis. A single protein band was visualized with silver staining. It had an apparent molecular weight of 91,000 as expected for plasminogen.

These results demonstrate that a ligand can be attached to prepacked non-porous, monodisperse polymer particles and function in high pressure affinity chromatography to perform separations of proteins from complex mixtures.

The invention has been described in detail with particular reference to preferred embodiments thereof, but it will be understood that variations and modifications can be effected within the spirit and scope of the invention.

We claim:

1. A high performance affinity chromatography separation device comprising:

A) a chromatographic column containing:
B) a packing material;
wherein the packing material is a plurality of non-porous, monodisperse polymeric particles having i) a particle size in the range of 0.01 to about 5 micrometers and ii) a surface reactive group having the formula:

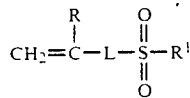

$$CH_2=C-L-S-R^1$$

wherein R is hydrogen or substituted or unsubstituted alkyl;

$R^1$ is $-CH=CHR^2$ or $-CH_2CH_2X$ wherein X is a leaving group which is displaced by a nucleophile or is eliminated in the form of HX by treatment with a base;

$R^2$ is hydrogen, substituted or unsubstituted alkyl of 1 to 6 carbon atoms, or substituted or unsubstituted aryl of 6 to 12 nuclear carbon atoms;

L is a substituted or unsubstituted alkylene linking group having 1 to 20 carbon and hetero atoms in the backbone;

substituted or unsubstituted arylene having 6 to 12 nuclear carbon atoms or a divalent combination of one or more of each of the alkylene and arylene groups defined above.

2. The device of claim 1 wherein the polymer particles are particles of polymers selected from the group consisting of poly(styrene-co-vinylbenzyl chloride-co-acrylic acid) (85:10:5 molar ratio); poly(styrene-co-acrylic acid)(99:1 molar ratio); poly(styrene-co-methacrylic acid) (90:10 molar ratio); poly(styrene-co-acrylic acid-co-m & p-divinylbenzene) (89:10:1 molar ratio); poly(styrene co 2 carboxyethyl acrylate) (90:10 molar ratio; poly(methyl methacrylate co acrylic acid) (70:30 molar ratio); poly(m & p-chloromethylstyrene); poly(95.5:4.5 molar ratio); poly{styrene-co-N-acrylamide}(99.3:0.7 molar ratio); poly(m & p chloromethylstyrene); poly(styrene-co-m & p chloromethylstyrene-co-2 hydroxyethyl acrylate) (67:30:3 molar ratio); poly(m & p chloromethylstyrene-co-methacrylic acid)(95:5, 98:2 and 99.8:0.2 molar ratio); poly(styrene-co-m & p-chloroethylsulfonylmethyl-styrene-co-methacrylic acid)(93.5:4.5:2 molar ratio); poly{styrene-co-N-acrylamide-co-methacrylic acid)(97.3:0.7:2 molar ratio); and poly(styrene-co-m & p-chloromethylstyrene)(70:30 molar ratio).

3. The device of claim 2 wherein the polymer particles are linked through the surface pendant reactive group to a biological ligand.

4. The device of claim 2 wherein the polymer particles are linked through the surface pendant reactive group to a biological ligand selected from the group consisting of Protein A, avidin or avidin complexes, monoclonal antibodies, polyclonal antibodies and lysine, gelatin, heparin, and Concavalin A.

5. The device of claim 2 wherein the polymer particles are linked through the surface pendant reactive groups to a biological ligand selected from the group consisting of Protein A, heparin, gelatin, Concavalin A, Protein G or protein-specific hydrophobic dyes.

6. The device of claim 2 wherein the polymer particles have a size in the range of 1 to 3μm.

* * * * *

UNITED STATES PATENT AND TRADEMARK OFFICE
CERTIFICATE OF CORRECTION

PATENT NO. : 5,043,062

DATED : August 27, 1991

INVENTOR(S) : Bale, et al

It is certified that error appears in the above-identified patent and that said Letters Patent is hereby corrected as shown below:

Title Page: [54] should read --HIGH PERFORMANCE AFFINITY CHROMATOGRAPHY COLUMN COMPRISING NON-POROUS, MONODISPERSE POLYMERIC PACKING MATERIAL      Line 6, Abstract should read --*monodisperse* polymeric particles--.

Col. 14 lines 19-33 read as follows:

acid-co-m & p-divinylbenzene) (89:10:1 molar ratio); poly(styrene co 2 carboxyethyl acrylate) (90:10 molar ratio; poly(methyl methacrylate co acrylic acid) (70:30 molar ratio); poly (m & p-chloromethylstyrene); poly(95.5:4.5 molar ratio); poly{styrene-co-N-acrylamide}(99.3:0.7 molar ratio); poly(m & p chloromethylstyrene); poly(styrene-co-m & p chloromethylstyrene-co-2 hydroxyethyl acrylate) (67:30:3 molar ratio); poly(m & p chloromethylstyrene-co-methacrylic acid)(95:5, 98:2 and 99.8:0.2 molar ratio); poly(styrene-co-m & p-chloroethylsulfonylmethyl-styrene-co-methacrylic acid)(93.5:4.5:2 molar ratio); poly(styrene-co-N-acrylamide-co-methacrylic acid)(97.3:0.7:2 molar ratio); and poly(styrene-co-m & p-chloromethylstyrene)(70:30 molar ratio).

UNITED STATES PATENT AND TRADEMARK OFFICE
CERTIFICATE OF CORRECTION

PATENT NO. : 5,043,062
DATED : August 27, 1991
INVENTOR(S) : Bale, et al

It is certified that error appears in the above-identified patent and that said Letters Patent is hereby corrected as shown below:

--acid-co-m & p-divinylbenzene) (89:10:1 molar ratio); poly(styrene-co-2-carboxyethyl acrylate) (90:10 molar ratio); poly(methyl methacrylate-co-acrylic acid) (70:30 molar ratio); poly(m & p-chloromethylstyrene); poly[styrene-co-m & p-chloroethylsulfonylmethyl styrene] (95.5:4.5 molar ratio); poly(styrene-co-N-[m & p-(2-chloroethylsulfonylmethyl)phenyl]acrylamide} (99.3:0.7 molar ratio); poly(m & p-chloromethylstyrene); poly(styrene-co-m & p-chloromethylstyrene-co-2-hydroxyethyl acrylate) (67:30:3 molar ratio); poly(m & p-chloromethylstyrene-co-methacrylic acid) (95:5, 98:2 and 99.8:0.2 molar ratio); poly(styrene-co-m & p-chloroethylsulfonylmethyl-styrene-co-methacrylic acid) (93.5:4.5:2 molar ratio); poly(styrene-co-N-[m & p-(2-chloroethylsulfonylmethyl)phenyl]acrylamide-co-methacrylic acid) (97.3:0.7:2 molar ratio); and poly(styrene-co-m & p-chloromethylstyrene) (70:30 molar ratio)--.

Signed and Sealed this

First Day of June, 1993

Attest:

MICHAEL K. KIRK

Attesting Officer

Acting Commissioner of Patents and Trademarks